Jan. 8, 1929.  B. F. GAINES  1,698,191
THERMOSTATIC CONTROL FOR HEATING SYSTEMS
Filed Dec. 9, 1927
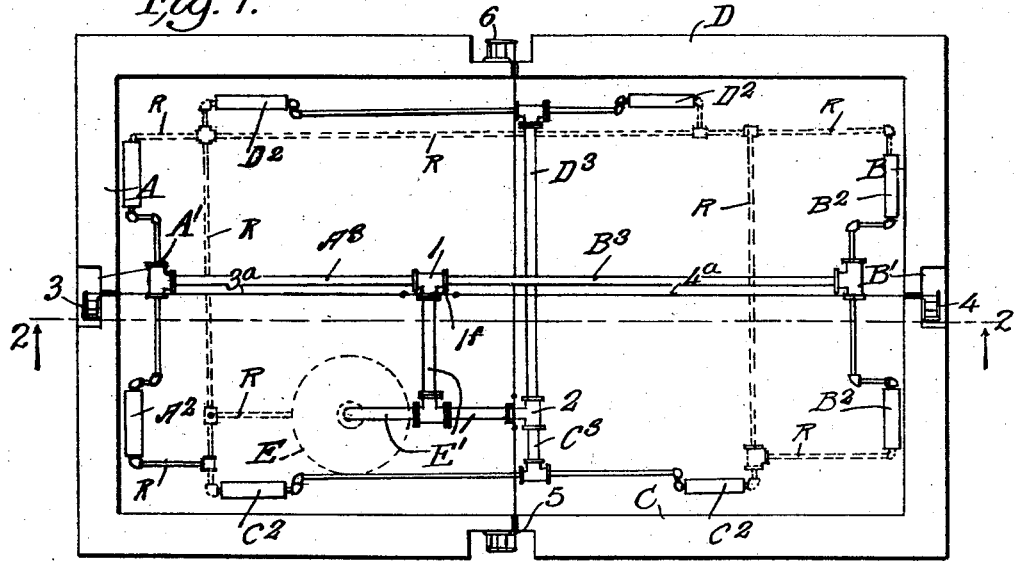
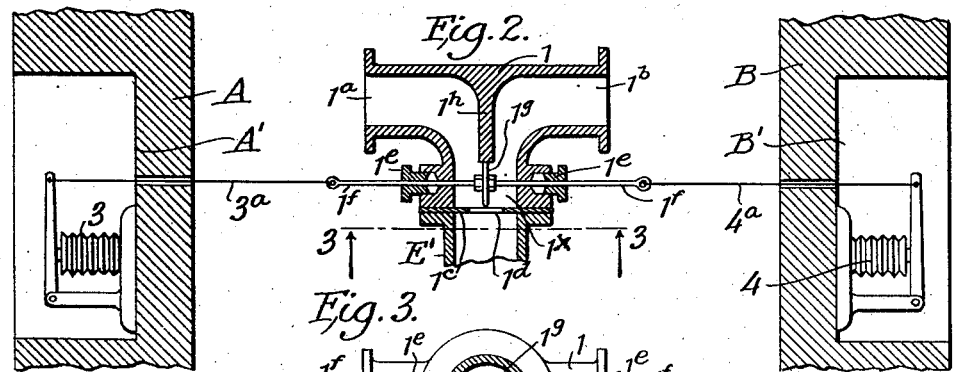
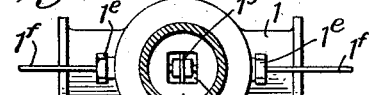
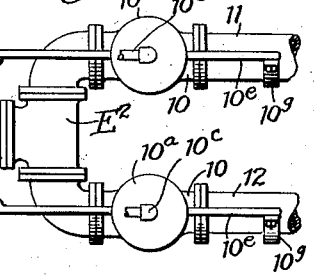
INVENTOR.
Benjamin F. Gaines
BY
Alexander Powell
ATTORNEY.

Patented Jan. 8, 1929.

1,698,191

UNITED STATES PATENT OFFICE.

BENJAMIN F. GAINES, OF CHARLOTTE, NORTH CAROLINA.

THERMOSTATIC CONTROL FOR HEATING SYSTEMS.

Application filed December 9, 1927. Serial No. 238,912.

This invention is a novel improvement in thermostatic controls for heating systems, particularly steam, hot water, vapor, hot air, or other heating systems for buildngs and the like, and the principal object of the invention is to provide a thermostatic control for automatically regulating the amount of steam or heating medium supplied to radiators, heating devices, or receptacles, etc. at opposite sides of a building according to the difference in temperatures at the outside surfaces of said opposite walls of the building, two such controls being employed in any ordinary four walled building to take care of the four sides and to divide the supply of steam or other heating medium in accordance with the outside temperatures at each side of the building.

I will explain the invention with reference to the accompanying drawing which illustrates several practical embodiments thereof to enable others familiar with the art to adopt and use same; and will summarize in the claims the novel features of construction, and novel combinations of parts, for which protection is desired.

In said drawings:—

Fig. 1 conventionally illustrates one form of my invention applied to a four-sided building;

Fig. 2 is a section on the line 2—2, Fig. 1;

Fig. 3 is a section on the line 3—3, Fig. 2;

Fig. 4 shows in elevation a modification of the control;

Fig. 5 shows a plan view of the modification shown in Fig. 4.

As shown in the drawing, the four walls of the building indicated at A, B, C, D, house the furnace E of the usual steam, hot water, vapor, hot air, or other heating system. Adjacent the furnace E are two similar valve casings 1 and 2 disposed at right angles to each other, said valve casings receiving the heating fluid through pipes E' and dividing the fluid as hereinafter explained, one outlet of casing 1 supplying through pipe $A^3$ all the radiators $A^2$ disposed adjacent the wall A, the other outlet of casing 1 supplying through pipe $B^3$ all the radiators $B^2$ disposed adjacent the diametrically opposite wall B. Similarly one outlet of valve casing 2 supplies through pipe $D^3$ all the radiators $D^2$ disposed along the wall D, the other outlet of casing 2 supplying through pipe $C^3$ all the radiators $C^2$ disposed along the diametrically opposite wall C. R indicates the return piping from all the radiators $A^2$, $B^2$, $C^2$, and $D^2$ to the furnace or boiler E (where necessary). Means are provided for proportioning the amount of heating medium discharged through each valve casing 1 and 2 to send the greatest amount of heat or medium to the radiators along the wall having the lowest outside temperature, or to the windward wall of the building.

As shown in Fig. 2, valve casing 1 is preferably of substantial T-shape having opposite flanged outlets $1^a$, $1^b$ to which the pipes $A^3$, $B^3$, for the radiators $A^2$ and $B^2$ along the opposite walls A and B are respectively coupled. The inlet $1^x$ of casing 1 is bolted to the furnace supply pipe E' and a plate $1^c$ having a centrally disposed rectangular orifice $1^d$ therein is interposed between the meeting flanges of the inlet $1^x$ and pipe E'. Extending through stuffing boxes $1^e$ above the inlet $1^b$ and parallel with the axis of the outlets $1^a$, $1^b$, is a rod $1^f$ carrying at its center within the casing 1 a valve plate $1^g$ disposed over the opening $1^d$ in plate $1^c$. A vertical wall $1^h$ separates the outlets $1^a$, $1^b$, the lower end of wall $1^h$ slidably engaging the upper end of plate $1^g$, whereby as plate $1^g$ is moved slightly in either direction from the dead-center said plate will increase the normal passage through either outlet $1^a$ or $1^b$ and correspondingly reduce the normal passage to the other outlet, the greater amount of heating medium passing to the outlet having the larger passage through opening $1^d$ of plate $1^c$.

Rod $1^f$ is controlled by opposed thermostat elements 3 and 4 preferably placed in recesses A' and B' in walls A and B, rod $1^f$ having its ends connected with wires $3^a$ and $4^a$ which are attached to the moving elements of the thermostats respectively. The thermostats may be of any desired type, such as copper corrugated elements filled with a volatile liquid and operating a pivotal arm. Hence the difference in temperatures at opposite sides of the building will control the position of valve plate $1^g$, which will always be moved toward the wall having the higher exterior temperature, and therefore the greater amount of steam, or other heating medium, will be directed by valve plate $1^g$ to the colder side of the building in accordance with the heating needs.

The second valve casing 2 and thermostats 5 and 6 operate in exactly the same manner as above described between the two other walls C and D of the building, and hence need no particular description herein. In the case of row-houses having party walls on two sides only one such valve casing would be ordinarily required.

As shown in Figs. 4 and 5 a different valve arrangement is illustrated, the orificed plate 1$^c$ and the sliding valve plate 1$^g$ of Figs. 1, 2 and 3 being replaced by two pressure reducing valves 10 such as shown and described in my copending application, Serial No. 140,866, filed October 11, 1926. The steam or heating medium from the furnace pipe E′ divides through a T-coupling E$^2$ and enters the valves 10 which control the heat respectively passing through outlets 11 and 12 to opposite walls A—B or C—D of the building. In brief each valve 10 has a pair of opposed diaphragm chambers 10$^a$, 10$^b$, with pipe connections 10$^c$, 10$^d$, from the chambers to the inlet and outlet sides respectively of the valves; also a pair of pivoted levers 10$^e$, 10$^f$, connected with their respective diaphragms, a link 10$^g$ connecting the adjacent ends of the levers, the lever 10$^f$ being connected to the valve stem 10$^h$. The construction and operation of each valve 10 is clearly set forth in my aforesaid application and therefore needs no particular description herein. A link 13 connects the outer ends of each lever 10$^e$, and an arm 14, carrying a weight 14$^a$ is vertically pivoted as at 14$^b$ to the center of link 13, the arm 14 being connected to the wires 3$^a$ and 4$^a$ leading from the opposed thermostats 3 and 4, whereby the swinging of lever 14 from its neutral central position will increase the weight on one valve lever 10$^e$ and decrease the weight on the other lever 10$^e$. As the weighted arm 14 will always be swung towards the wall having the warmer exterior temperature the valve in the pipe leading to the opposite wall having the colder exterior temperature will be set to maintain a higher pressure, causing an excess of heating medium to be directed towards the colder wall, the settings of the valves being in accordance with the difference in expansions of the opposed thermostats.

I do not limit my invention to the exact forms shown in the drawing for obviously changes may be made therein within the scope of the claims.

I claim:

1. In a heating system for buildings, radiators adjacent opposite walls of a building; means for conducting the heating medium to said radiators; valves in said means; opposed thermostats located on the exterior of said opposite walls; and means operated by said thermostats for adjusting said valves according to the difference in exterior temperatures whereby the amount of heating medium directed to each side of the building will be governed by the difference between the exterior temperatures at the respective walls.

2. In a heating system for buildings, a fluid heating furnace, fluid receiving receptacles; a casing receiving the heating fluid from the furnace and having two outlets; pipes connecting said outlets to the receptacles at opposite walls of the building respectively; valve means controlling said outlets; opposed thermostats exposed to the exterior temperatures of said opposite walls; and connections between the thermostats and valve for adjusting said valve according to the difference in expansions of said thermostats, whereby the greater amount of heating fluid is directed through its respective outlet to the receptacles at the colder side of the building.

3. In a heating system for buildings having sets of opposite walls; a fluid heating furnace; fluid receiving receptacles disposed along the opposite walls; a casing for each set receiving the heating fluid from the furnace and having two outlets; pipes connecting said outlets to the receptacles at opposite walls of each set respectively; valve means in each casing for controlling said outlets; opposed thermostats exposed to the exterior temperatures of each set of opposite walls; and connections between the valve means and thermostats of each set for adjusting the valve according to the difference in expansions of said thermostats, whereby the greater amount of heating fluid in each set will be directed through its respective outlet to the receptacles at the colder side of the building.

BENJAMIN F. GAINES.